United States Patent [19]

Ottle

[11] 4,368,792

[45] Jan. 18, 1983

[54] WEIGHING SYSTEM

[75] Inventor: John C. Ottle, Alliance, Ohio

[73] Assignee: The Alliance Machine Company, Alliance, Ohio

[21] Appl. No.: 282,034

[22] Filed: Jul. 10, 1981

[51] Int. Cl.³ .......................................... G01G 19/18
[52] U.S. Cl. .................................. 177/147; 177/255; 212/158
[58] Field of Search ....................... 177/147, 151, 255; 212/158

[56] References Cited

U.S. PATENT DOCUMENTS 3,081,833  3/1963  Kester .................................. 177/147
3,899,034  8/1975  Polen .............................. 177/255 X Primary Examiner—Joseph W. Hartary
Attorney, Agent, or Firm—Buell, Blenko, Ziesenheim & Beck

[57] ABSTRACT

A novel weighing system for ladle handling apparatus. The system utilizes a plurality of fixed and movable load cells arranged in a stable 3-point configuration and a means for maintaining the load cells in accurate position between a sheave basket and ladle hanger to prevent misalignment and inaccuracy. Uneven distribution of the material does not affect the stability of the system and an accurate weight of the ladle is determined.

7 Claims, 8 Drawing Figures

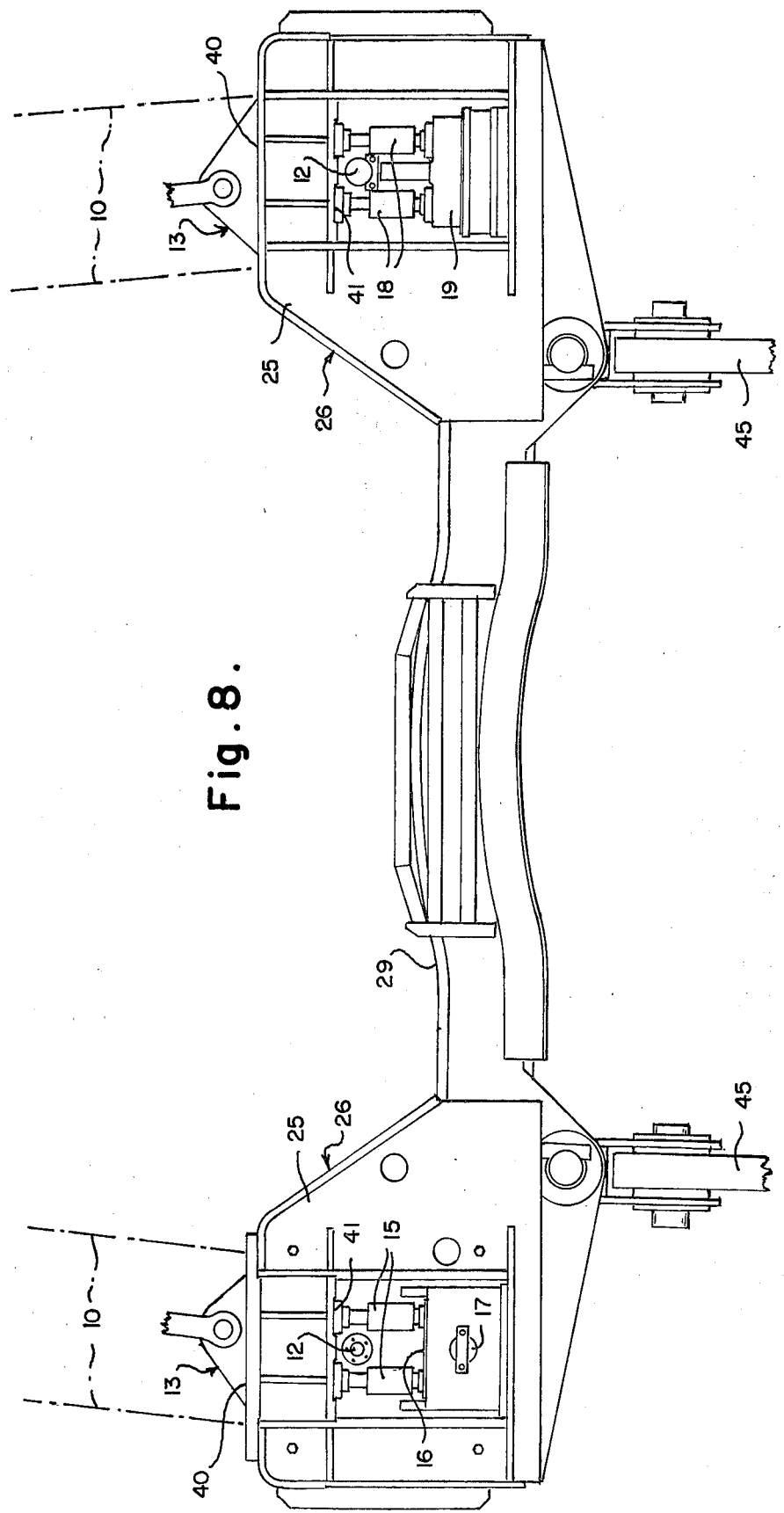

WEIGHING SYSTEM

This invention relates to a weighing system which utilizes both fixed and movable load cells in a ladle handling system. The invention is an improvement over that disclosed in our U.S. Pat. No. 3,899,034 issued Aug. 12, 1975. The weighing system of the present invention eliminates inaccurate readings of the weight caused by misalignment of the load cells.

Weighing systems are commonly used with material handling devices such as ladle crane hangers, scrap chargers and conveyors. A weighing system in conjunction with a ladle crane hanger permits the operating personnel to know how much molten steel is initially in the ladle and how much remains after each pouring. This information enables the operators to determine when there is not enough molten steel remaining for another ingot and thereby prevents the waste of an ingot due to an insufficient amount of metal. In earlier U.S. Pat. No. 3,899,034 of myself and Karl Polen, we disclosed a weighing system which generally overcame many of the problems faced by the art in connection with ladle crane hanger weighing systems. In that system we provided load cells between the sheave basket and ladle hanger. In order to stabilize the sheave basket in the load hanger we used truss rods and bolted flexure plates designed to allow the basket to move within the limits of deflection of the load cells. This system in general worked satisfactorily. Unfortunately, however, despite all the obvious advantages of using a weighing system such as that of U.S. Pat. No. 3,899,034, we have discovered that any misadjustment or a destructive impact can change these truss rods and flexure plates and cause misalignment of the load cells leading to inaccurate impulses from the load cells to the electronic counters, thus producing a false readout.

The load of a ladle hanger and a ladle of molten steel can weigh as much as 900,000 pounds hanging from a crane on wire ropes 60 or 70 feet long. If the ladle or hanger accidentally collides with a fixed object, which can readily happen in steel-mill practice, damage can readily occur to the truss rods and flexure plates of our earlier patented structure. Similarly some human misadjustment of these rods or plates can lead to misadjustment. In both cases, if the misalignment exceeds about one (1°) degree on the load cells, the readings from the load cells will be inaccurate. The economic consequences of such errors can be serious.

The invention of the present application overcomes the problems presented by such misalignment errors. The invention provides a weighing system which is comprised of fixed and movable load cells at each end of the surface on which the load is contained. The plurality of cells are arranged so that they act as a stable 3-point system. Two load cells are fixed and two are movable at each end between the sheave basket and load hanger. This is exactly as described in our earlier U.S. Pat. No. 3,899,034. The movable cells adjust to the load distribution thereby avoiding the overloading of any cell. Thus, cell's limits are not exceeded and an accurate reading is fed from each cell to the counter. The ladle hanger in the present invention is provided with accurately machined pads and threaded holes with adjustment bolts which engage accurately machined guides and pads on the sheave basket so that the sheave basket can be accurately set in the ladle hanger and held against such transverse movement as will affect the accuracy of the load cells. The weighing system of the present invention reduces the error factor due to uneven load distribution or misalignment to a minimum.

In the foregoing general description, I have set out certain purposes, objects and advantages of our invention. Other objects, purposes and advantages will be apparent to those skilled in the art of material weighing when considering the following description and the drawings in which:

FIG. 8 is a side elevational view of an entire ladle hanger assembly according to the invention.

Figure 1:
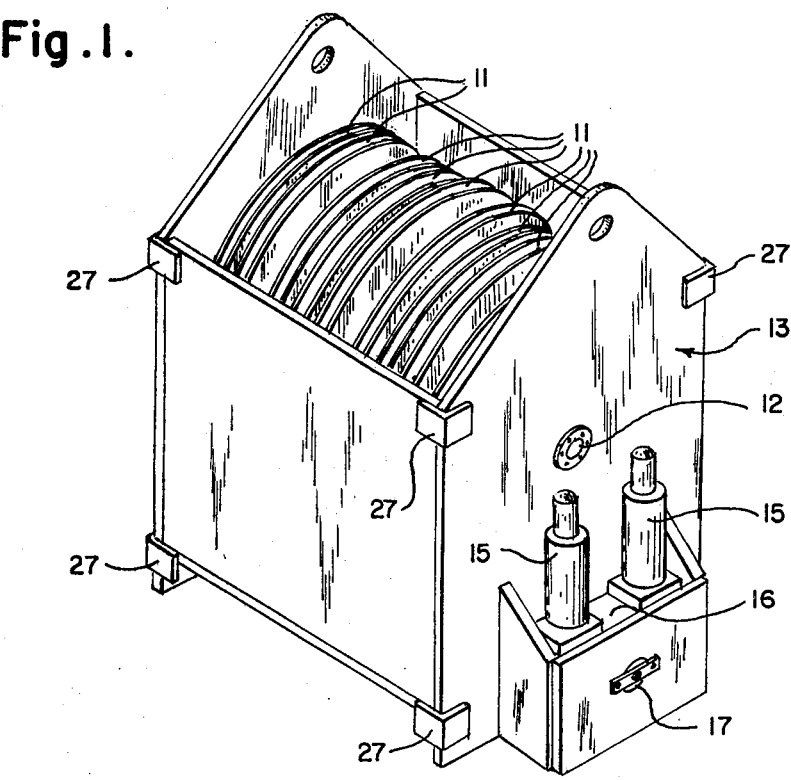
FIG. 1 is a perspective view of a lifting basket of a ladle crane hanger employing the weighing system of the present invention.

Referring to the drawings, I have illustrated two particular material handling systems which incorporate the weighing system of the present invention.

Figure 2:
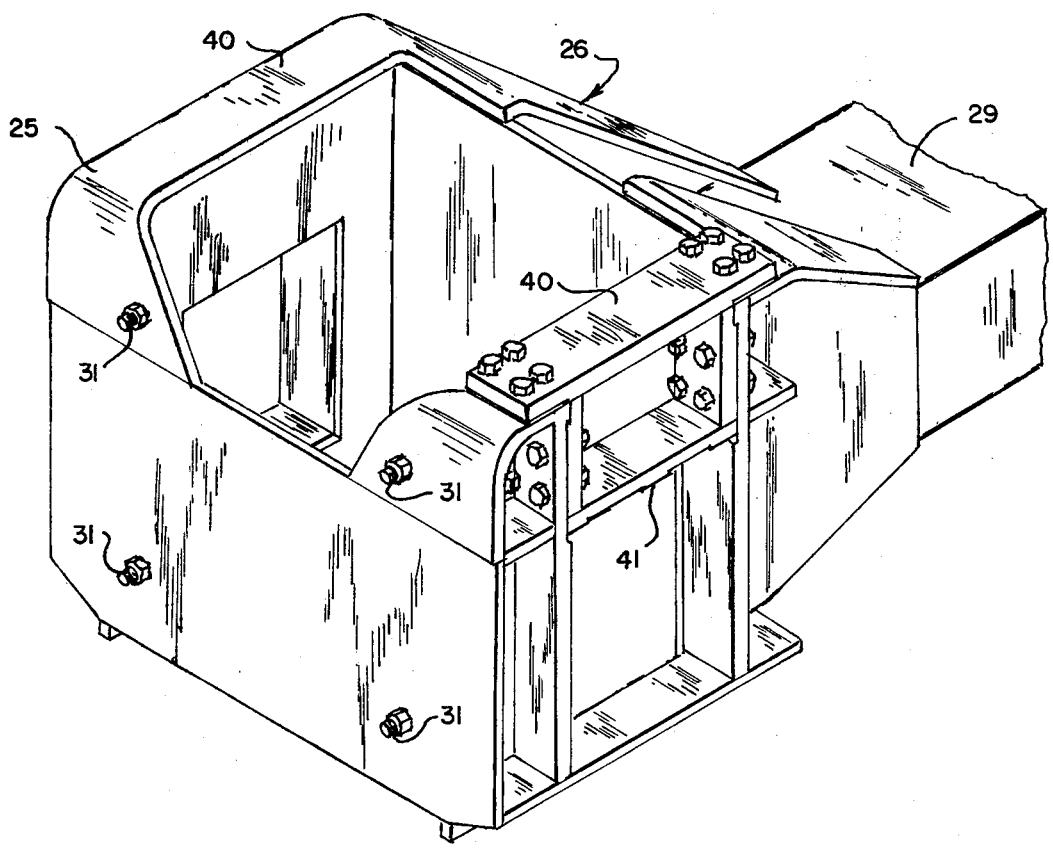
FIG. 2 is a perspective view of the left-hand portion of the hook basket of a ladle crane hanger.
Figure 3:
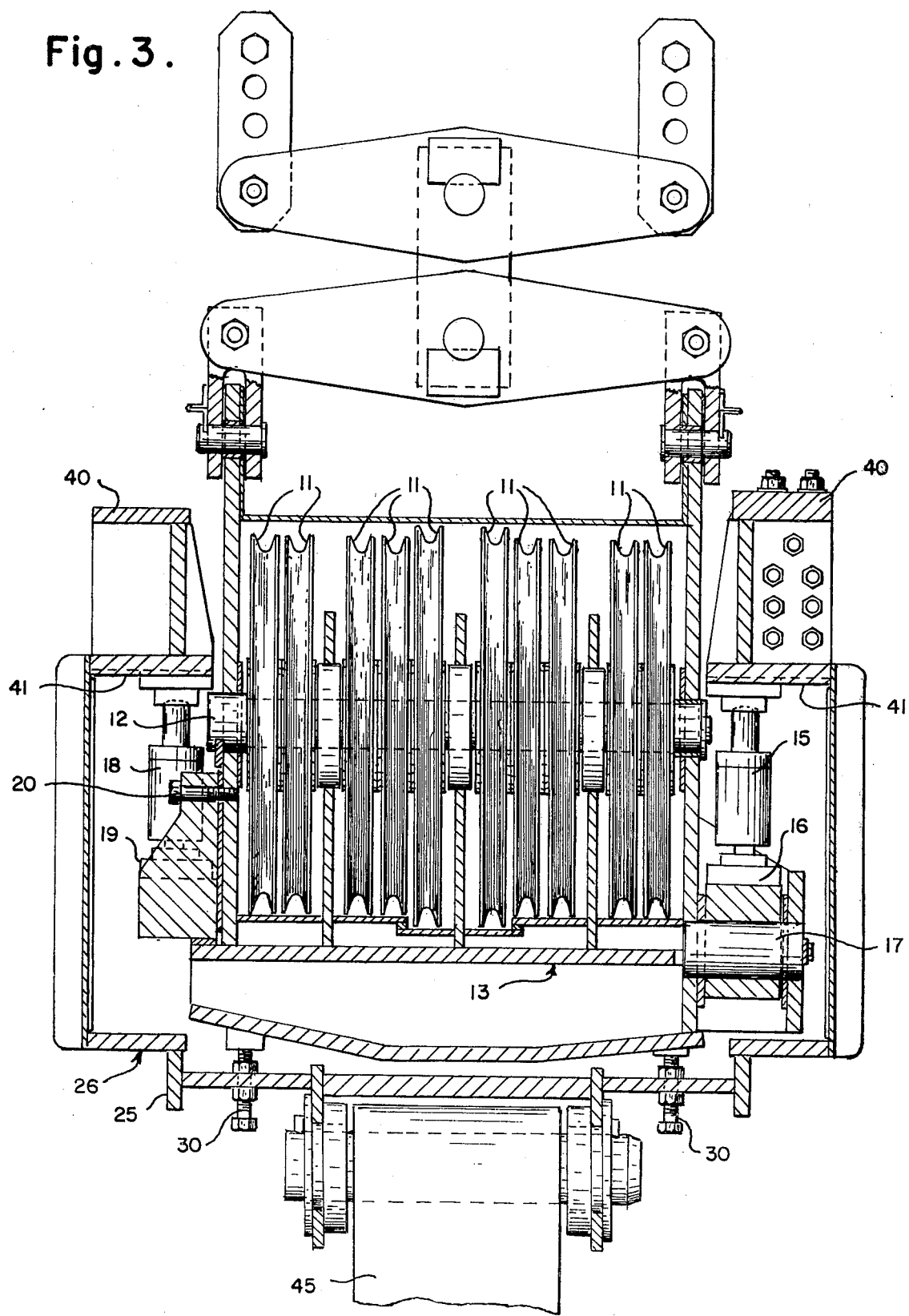
FIG. 3 is a section on the axis of the sheaves of one end of the assembled crane hanger.
Figure 4:
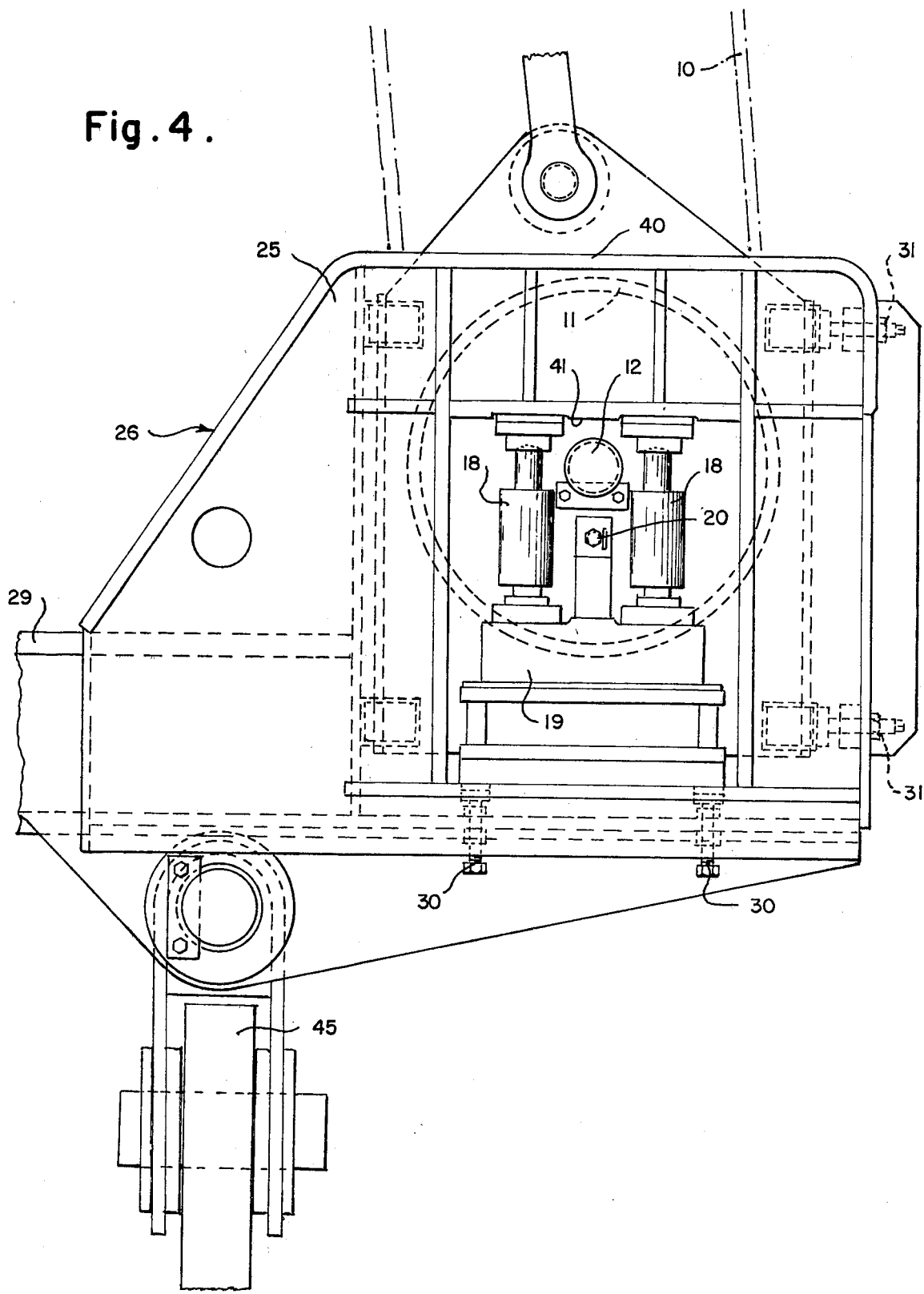
FIG. 4 is a fragmentary side elevational view of one side of one end of the assembled crane hanger and basket showing the fixed cells and employing the weighing system of the present invention.
Figure 5:
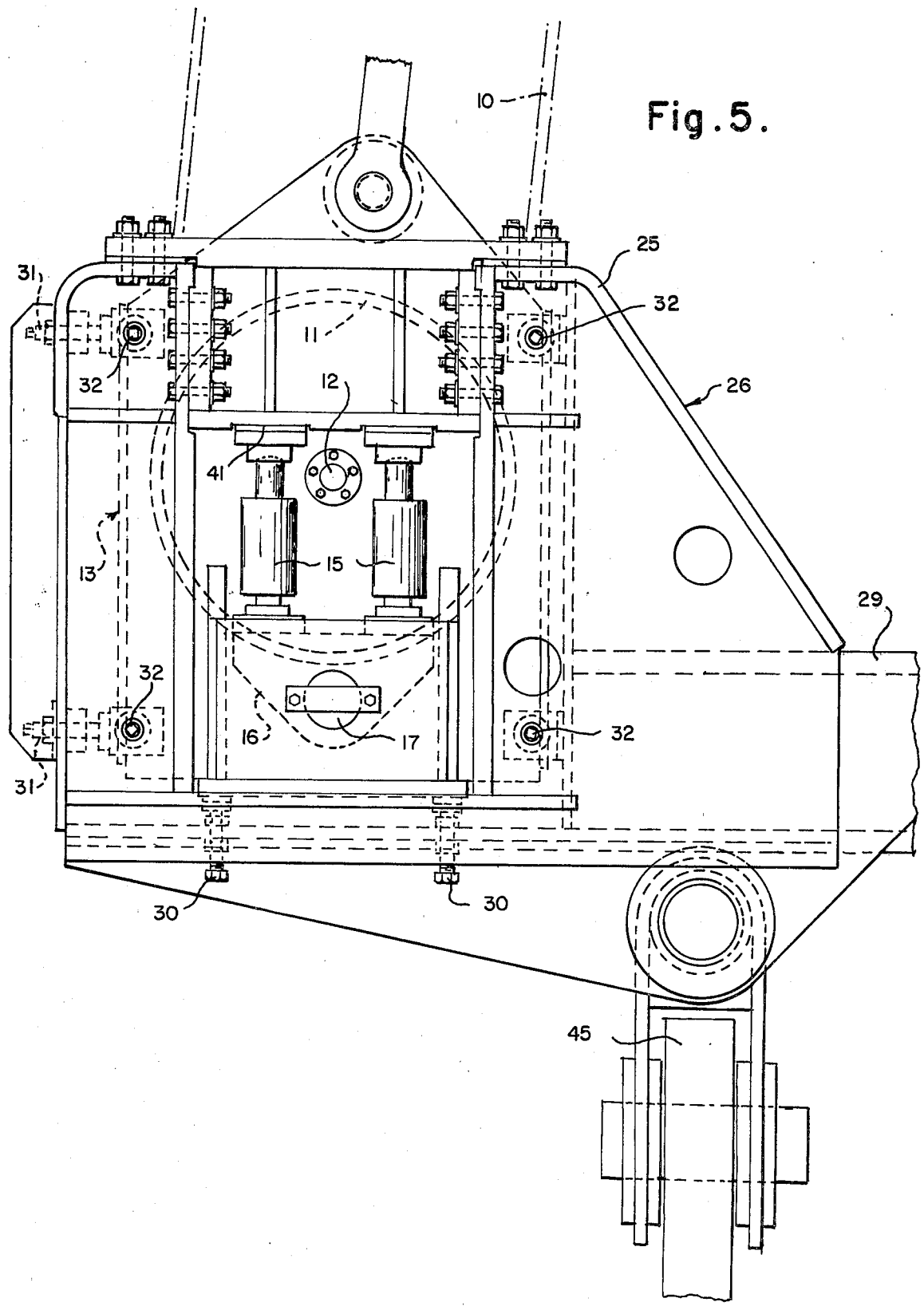
FIG. 5 is a fragmentary side elevational view of the opposite side of one end of the assembled crane hanger showing the movable cells.
Figure 6:
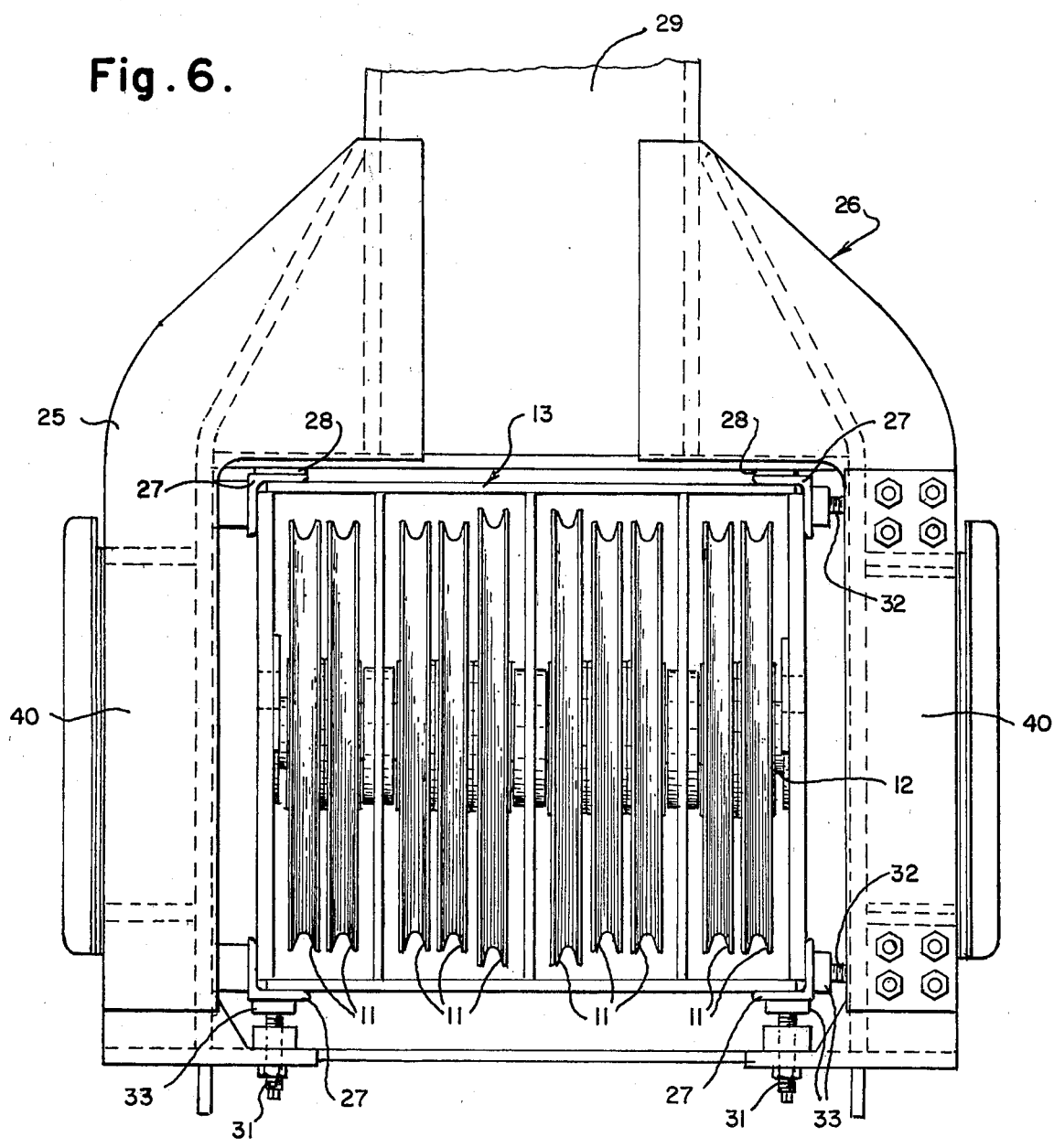
FIG. 6 is a fragmentary top plan view of the same one end shown in FIGS. 4 and 5.
Figure 7:
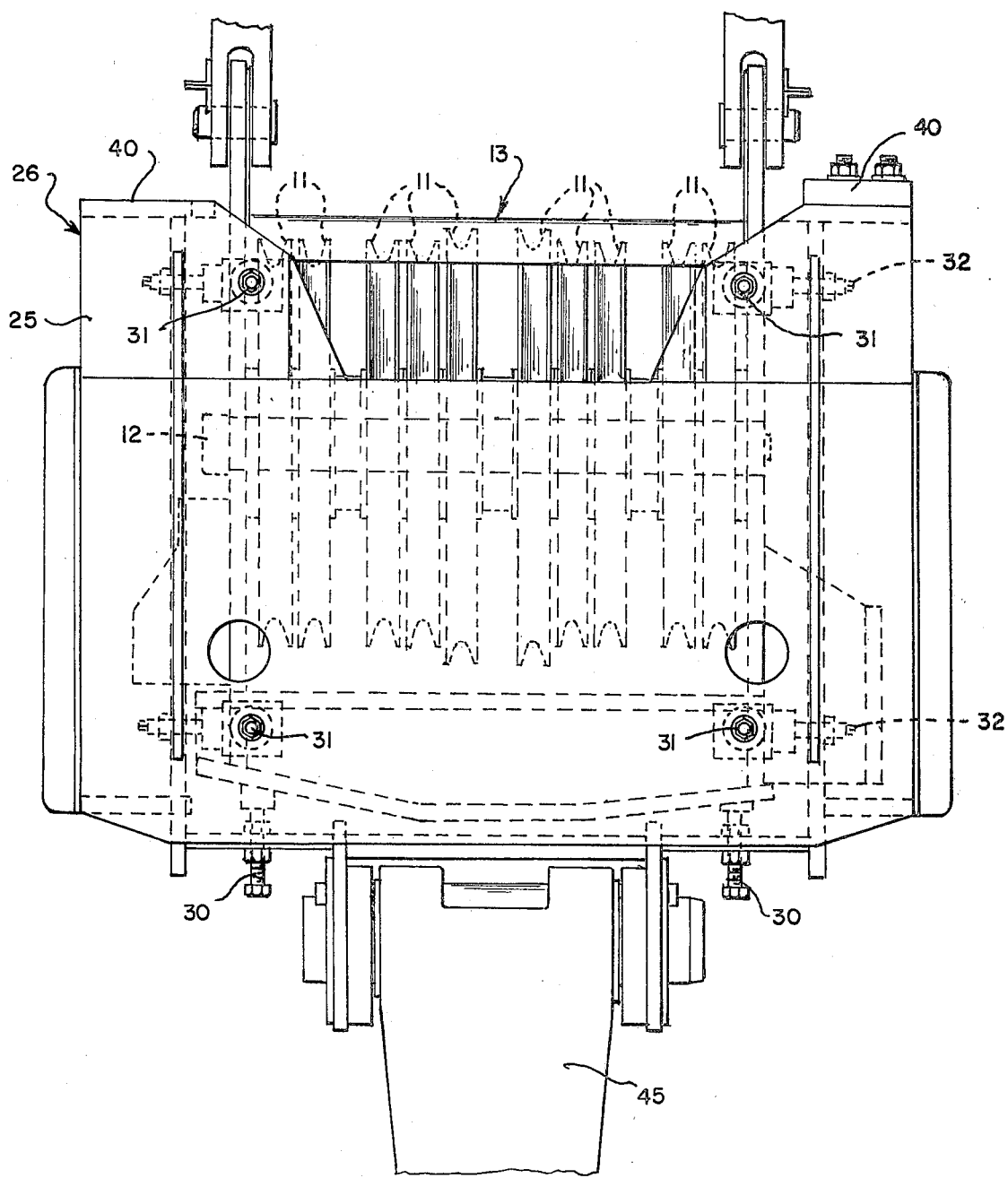
FIG. 7 is an end view of the same one end.

Referring to the drawings FIGS. 1 through 7 show the left-hand end elements of a typical ladle crane hanger and FIG. 8 shows a side elevational view of the entire ladle crane hanger. The lifting mechanism, FIG. 1, in the form of a sheave basket is inserted into the hook support section, FIG. 2, as shown in FIGS. 3 through 7. Lifting ropes 10 pass around on sheaves 11 which are mounted on shaft 12 in sheave basket 13 and connected to an overhead crane (not shown) in usual manner. The crane moves the ladle crane hanger both horizontally and vertically in the usual manner. Ropes 10 generally are not perpendicular to the ground but are at a slight angle. Two movable load cells 15 are pivotally mounted on basket 13 by means of platform 16 and pin 17. Two fixed load cells 18 are mounted on a fixed platform 19 fastened on basket 13, opposite movable cells 15 by bolts 20.

The sheave basket 13 is inserted into the end box 25 of ladle hanger 26 so that corner guide pads 27 of the sheave box are against the finish pads 28 on the end box adjacent the main body 29 of hanger 26, and on adjusting bolts 30 on the bottom of the end box 25. Adjusting bolts 31 on the end and adjusting bolts 32 on the sides of the end box 25 are provided with pads 33 which are tightened against the corner guide pads 27 of the sheave box. Bolts 30, 31 and 32 are adjusted to provide essentially perfect vertical alignment of the load cells 15 and 18 between the sheave basket 13 and load hanger 26. A fabricated load beam 40 forming a part of end box 25 is placed over the top ends of the load cells 15 and 18 at each side of the end box 25 with a bottom surface 41 resting on the top end of the load cells 15 and 18 respectively.

Ladle hooks 45 of conventional form are suspended from the two ends of ladle hanger 26 in usual manner to engage and lift a ladle (not shown) in usual manner.

In operation the ladle hanger is assembled with the sheave baskets 13 fixed in the end boxes 25 at each end of the ladle hangers with a gap of about 0.006±0.002 inch at each pad 32 so that the sheave basket can move vertically relatively to the ladle hanger end box 25 but cannot move transversely more than 0.006±0.002 inch. This eliminates the problem of misalignment of the load cells which made prior devices unsatisfactory. The distribution of metal in the ladle and the fact that the ropes 10 are not precisely vertical causes the weight supported by each hook to vary somewhat. Cells 15 are mounted to permit a limited movement of their support platform 16 on pin 17, but cells 15 remain in vertical alignment with the hanger. As a result each cell 18 acts as one leg of a system and the cells 15 act in combination as the third leg. Therefore no matter how the load might shift the system is always stable and the load cells always accurately aligned.

A stable system permits the accurate measurement of the load. No one cell's limits are overridden by a disproportionate distribution of load upon that cell. The readings from all eight cells are averaged in a commercially available counter by means well known in the art. Since no cell's limit has been over-ridden, correct averaging is possible and the read out of weight from the counter is accurate.

In the foregoing specification, I have set forth certain preferred practices and embodiments of ladle hanger systems incorporating the weighing system of the present invention. However, it will be understood that the ladle hanger system of this invention may be otherwise embodied within the scope of the following claims.

I claim:

1. A weighing system for a ladle handling apparatus comprising an elongate ladle hanger, a sheave basket in each end of said ladle hanger, a plurality of fixed load cells and a plurality of movable load cells, said fixed cells and said movable cells being operably connected to form a 3-point system, each of said fixed cells being one of two legs of the system and one or more of the movable cells being said third leg, said cells being mounted on said sheave baskets at opposite ends of said ladle hanger, vertical guide pads on said sheave baskets and guide means on said ends of said ladle hanger engaging the guide pads on the basket to permit limited relative vertical movement but substantially prevent non-vertical movement, said cells being in operable contact with loadbearing surfaces on said ladle hanger, means connecting said cells to an averaging device, and means for recording said average.

2. The weighing system of claim 1 wherein said system is comprised of two fixed cells and two movable cells on each sheave basket, said fixed cells being on one side and said movable cells on the other side of said basket.

3. A weighing system for a ladle handling apparatus as claimed in claim 1 wherein said ladle handling apparatus includes a main support frame, a vertical sheave basket receiving well at each end of said frame, at least two vertical fixed guide pads in said wells against which the vertical guides of the sheave baskets are received and a plurality of movable guide pads adjustable against the guides of the sheave basket to restrict non-vertical movement.

4. A weighing system as claimed in claims 1 or 2 or 3 wherein at least two fixed cells are provided at spaced apart points, said fixed cells forming two suspension points and the movable cells forming the third suspension point between each sheave basket and the ladle hanger.

5. A weighing system for a ladle crane hanger as claimed in claims 1 or 2 or 3 wherein the load bearing surfaces are a pair of removable load beams attached to the ladle hanger on opposite sides of said sheave basket at each end of said ladle hanger.

6. A weighing system for a ladle crane hanger as claimed in claims 1 or 2 or 3 wherein the two ends of the ladle hanger are provided with adjustable spacer means contacting the bottom of the sheave baskets to space them a pre-selected distance from the load bearing surfaces.

7. A weighing system for a ladle crane as claimed in claims 1 or 2 or 3 wherein the movable guide pads include a threaded screw member threadingly engaged in the end of the ladle hanger and pads on the end of each threaded member bearing on the vertical guide pads of the sheave basket.

* * * * *